United States Patent [19]

Inoue et al.

[11] Patent Number: 4,736,085
[45] Date of Patent: Apr. 5, 1988

[54] CURRENT SUPPLYING APPARATUS FOR A WIRE-CUT ELECTRIC DISCHARGE MACHINE

[75] Inventors: Kiyoshi Inoue, Tokyo; Jun Hayakawa; Sadao Sano, both of Kawasakishi, all of Japan

[73] Assignee: Inoue Japax Research Incorporated, Japan

[21] Appl. No.: 642,686

[22] PCT Filed: Dec. 7, 1983

[86] PCT No.: PCT/JP83/00432
§ 371 Date: Aug. 7, 1984
§ 102(e) Date: Aug. 7, 1984

[87] PCT Pub. No.: WO84/02297
PCT Pub. Date: Jun. 21, 1984

[30] Foreign Application Priority Data

Dec. 7, 1982 [JP] Japan ................... 57-214846
Dec. 7, 1982 [JP] Japan ................... 57-185630
Jan. 17, 1983 [JP] Japan ................... 58-003317

[51] Int. Cl.$^4$ ............................................. B23H 7/04
[52] U.S. Cl. ................... 219/69 W; 204/206; 219/137.62
[58] Field of Search .......... 219/69 W, 137.61, 137.62; 204/206, 224 M; 339/111, 117 R, 112 R, 58; 308/3 R, 3 A; 439/111, 121, 117

[56] References Cited

U.S. PATENT DOCUMENTS

| | | | |
|---|---|---|---|
| 2,685,075 | 7/1954 | Mol | 339/112 R |
| 3,891,819 | 6/1975 | Ullmann et al. | 219/69 W |
| 3,972,577 | 8/1976 | Charles et al. | 339/117 R |
| 4,052,584 | 10/1977 | Reznicek | 219/69 W |
| 4,239,952 | 12/1980 | Rhyner | 219/69 W |
| 4,422,918 | 12/1983 | Inoue | 219/69 W |
| 4,539,459 | 9/1985 | Yamagata | 219/69 W |
| 4,559,433 | 12/1985 | Aramaki et al. | 219/69 W |

FOREIGN PATENT DOCUMENTS

| | | | |
|---|---|---|---|
| 54-37091 | 11/1979 | Japan | 219/137.61 |
| 81-02402 | 9/1981 | PCT Int'l Appl. | 219/137.61 |
| 471986 | 9/1975 | U.S.S.R. | 204/224 M |
| 233810 | 10/1977 | U.S.S.R. | 219/69 W |

*Primary Examiner*—A. D. Pellinen
*Assistant Examiner*—Geoffrey S. Evans
*Attorney, Agent, or Firm*—Roberts, Spiecens & Cohen

[57] ABSTRACT

A wire-cut electric discharge machine in which a current supplying member is in direct contact with a wire electrode, the shape of the current supplying member and the direction of passage of the wire electrode before and after the member being adapted to each other to prevent the formation of narrow gaps of sharp wedge-shaped cross section which could lead to harmful discharge and damage to the wire electrode and possible breakage of the wire electrode. In a preferred embodiment the current supplying member has a thick heel portion and a narrow sole portion and cooling fluid is discharged against the narrow sole portion.

12 Claims, 4 Drawing Sheets

CURRENT SUPPLYING APPARATUS FOR A WIRE-CUT ELECTRIC DISCHARGE MACHINE

TECHNICAL FIELD

The present invention relates to improvements in an apparatus for supplying current to a wire electrode which is used in a wire-cut electric discharge machine and, more particularly, to an improved current supplying apparatus which can supply a substantially larger average working current than that by a conventional apparatus without causing breaking of the wire electrode due to gaseous discharge between the wire electrode and the current supplying member such as a pin, roller, shoe, or the like by supplying the current while directly contacting the wire electrode.

BACKGROUND ART

Wire-cut discharge machines cut a workpiece in the manner such that: a wire electrode is fed from a supply reel, and moved between a pair of electrode positioning guides under a predetermined tension, and sent and collected by an apparatus such as a take-up reel or the like; the workpiece approaches the wire electrode from the direction which is almost perpendicular to the axis of the wire electrode and forms a work gap; kerosene, demineralized water or the like is supplied as a working fluid in this gap; a train of machining voltage pulses is supplied between the wire electrode and the workpiece, thereby generating a train of pulse discharges in the work gap, while the workpiece and wire electrode are relatively fed.

However, in the conventional wire-cut discharge machine, there is a problem that accidental breaking of the wire electrode occurs.

If the electric power supplied to the wire electrode is limited to a low level, the incidence of accidents can be held to an extremely low level.

However, by doing so, the machining speed decreases and also in certain cases, the objects of machining are never realized.

The breaking of wires occurs at various locations for various reasons.

It has been conventionally considered that more of such accidents are caused when the gaseous discharge or other abnormal discharge is generated at the discharge point in the work gap.

Therefore, conventionally, in order to reduce the incidence of accidental breakage and to safely and continuously perform the machining by use of high current at high speed and under high load, it has been considered that it is sufficient to supply a large amount of working fluid to the discharge point so as not to cause the gaseous discharge in the working gap; thus, for attainment of such object, engineers have been mainly concerned with improvements in the technology of supplying the working fluid to the discharge point in the working gap.

However, the inventors of the present invention have discovered that although accidental wire breakage occurs due to the abnormal discharge which is generated at the discharge point, in many cases, it is caused by spark discharges which occur at the contact point of the wire electrode and the current supplying apparatus for supplying a train of current pulses for machining, under certain working conditions or circumstances, and that this problem will never be solved by only the improvement in the above-mentioned working fluid supplying technology, and according to this discovery, the inventors completed the present invention.

The current supplying apparatus according to the conventional technology is constituted such that no harmful gaseous discharge is generated between the wire electrode and the current supplying apparatus in the manner such that: for instance, the central axis of the apparatus is disposed perpendicularly to the passage of the wire electrode; the apparatus has a cylindrical surface arranged so that the wire electrode can come into contact therewith with a strong surface pressure; and the above-mentioned cylindrical surface portion where the current supplying apparatus which comes into contact with wire electrode is surrounded and cooled by the cooling water or the like, which is discharged along the wire electrode, or if not so, it is disposed in the main body of the working fluid jet nozzle filled with the working fluid, or another but similar method.

Such a cylindrical current supplying surface is widely used since it has the advantages that: the processing of it, particularly, the abrasive finish is very easy; both the friction and contact resistance are small; it also is useful to straighten the wire electrode; the desired contact area and contact surface pressure can be substantially obtained; and due to this, it is possible to feed a current even to the thin wire electrode having a diameter of about 0.05 to 0.3 mm.

Although it was conventionally known that it is important to sufficiently cool such a current supplying apparatus, it was not known that even if this cooling is sufficiently performed, spark discharges occur and these discharges will cause accidental breaking of the wire electrode at the contact portion of the current supplying apparatus and the wire electrode.

In addition, it was not therefore understood that the shape of the current supplying apparatus is also important to solve such a problem.

By improvement of this portion according to the present invention, the incidence of accidental breaking of the wire electrode can be remarkably reduced and this makes it possible to carry on machining for a long time using a high current pulse train under high load.

SUMMARY OF THE INVENTION

The present invention seeks to solve the said problems in the above-mentioned conventional technology, intending to substantially completely prevent, by extremely simple means, the breaking of the wire electrode at the current supplying portion thereby making it possible to continue operation for a long time, using a train of high current pulses under high load.

The essential point of the present invention is that at least at one of the end points of the contact line of the wire electrode and the member for supplying current in direct contact with the wire electrode, namely, at one of the end points where troubles more frequently occur due to air bubbles, in order to set the contact angle between the member and the wire electrode to a proper value, the shape of the current supplying member and the passageways of the wire electrode before and behind the member correspond to each other, thereby preventing the formation of a gap with a wedge-shaped cross section therebetween and avoiding the occurrence of harmful electric discharge which may damage the wire electrode therebetween.

In the case where the current supplying apparatuses are provided respectively on both sides before and behind the workpiece in the passageway of the wire electrode, the present invention is applied first to the current supplying apparatus which is before the workpiece, namely disposed near to the wire electrode supplying apparatus.

Between two points, namely, between the contact start point where the wire electrode approaches the current supplying member and it first comes into contact therewith and the contact end point where the wire electrode leaves the current supplying member, ordinarily, the lower point is more important than the upper point.

When the contact angle of the current supplying member and wire electrode, particularly, the contact angle at the contact point in the portion where they are located on the lower side is fairly large, i.e., an angle over at least 60°, the residence of air bubbles in the relevant portion is prevented and the occurrence of harmful spark discharge is prevented, so that the incidence of accidental wire breakage is remarkably reduced. The current supplying capacity of the current supplying apparatus is also extremely increased.

Therefore, the working capability and operating ratio are substantially improved.

In this invention, the shapes of the current supplying member and wire electrode passageways before and after the member are selected so as not to lose the advantage of the above-mentioned cylindrical current supplying surface as far as possible.

BRIEF DESCRIPTION OF THE DRAWINGS

FIG. 3 is a front view of the current supplying apparatus shown in FIG. 2;

DETAILED DESCRIPTION OF A BEST MODE FOR CARRYING OUT THE INVENTION

First, a current supplying apparatus 100 for use in a well-known wire-cut electric discharge machine shown in FIG. 1 will be described.

Figure 1:
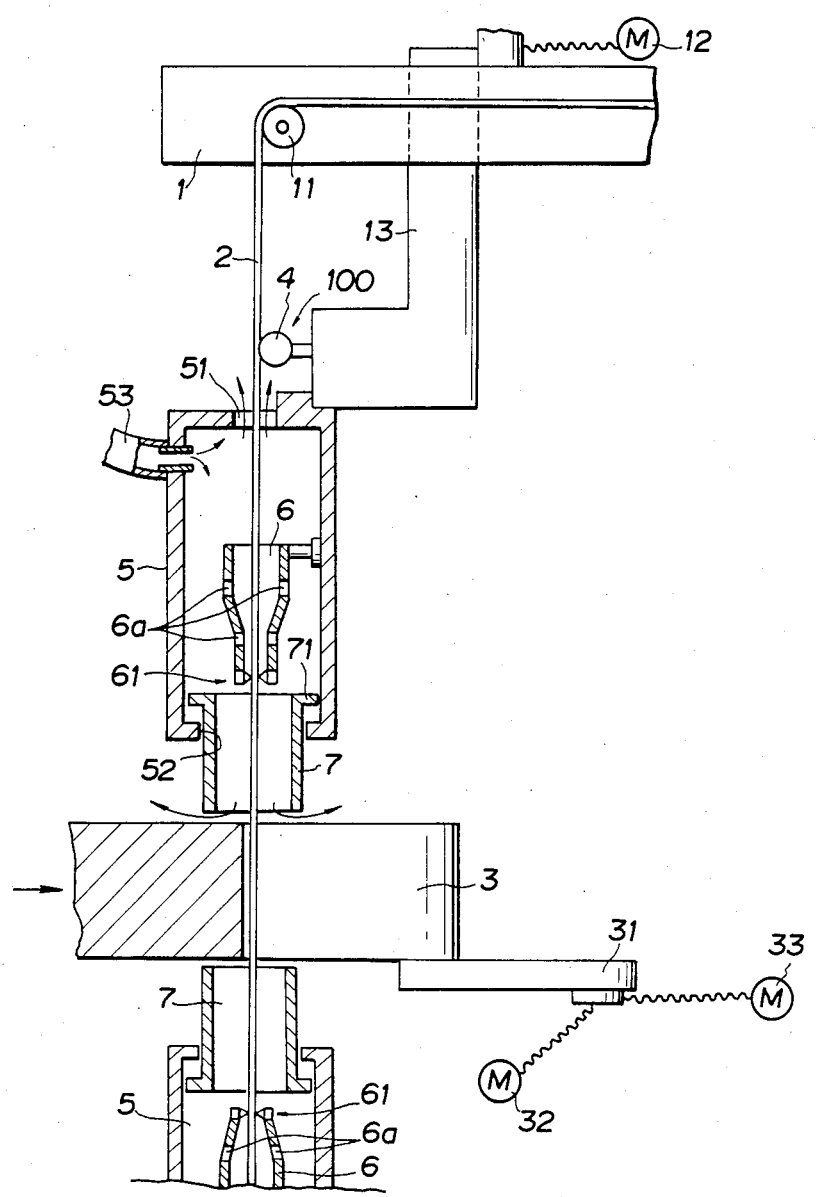
FIG. 1 is a side elevational view with a part cut away showing the main part of a wire-cut electric discharge machine provided with a well-known current supplying apparatus.

In FIG. 1, reference numeral 1 denotes an upper arm of a well-known wire-cut discharge machine; 2 is a wire electrode; 3 a workpiece; 4 a cylindrical current supplying shoe which forms the main part of the current supplying apparatus 100; 5 a nozzle main body; 6 a guide holder; and 7 a nozzle.

In addition FIG. 1 shows beneath the workpiece 3 a nozzle 7, a main guide body 5, and guide holder 6. The rest of the apparatus beneath the workpiece, such as the lower arm, is not shown as it corresponds almost symmetrically with the elements shown above the workpiece.

Since these lower components substantially correspond to the upper components, only the upper components will be described below.

In this wire-cut discharge machine, a working fluid is discharged and supplied between the workpiece 3 and the portion between the upper and lower nozzles 7 of the wire electrode 2, and at the same time a voltage pulse is applied, thereby performing the electric discharge operation.

The wire electrode 2 passes through a reel provided on a column or the like of the main body of the apparatus (not shown) and is led along the passage defined by the upper arm 1 or along the surface thereof; passes through a tention roller (not shown) and a guide roller 11 on the arm 1 and travels downward; the wire electrode passes through a guide roller provided on the lower arm (not shown) symmetrically with the guide roller 11; the wire electrode further passes through a capstan or take-up roller and the like (not shown); and is moved to a take-up reel or collecting vessel and the like.

An L-shaped supporting member 13 is attached to the arm 1 and can ascend and descend through a screw apparatus which is rotated by a motor 12, and the member 13 can be held at a desired location.

The conventional cylindrical shoe 4 made of sintered hard alloy is disposed in front of the lower end portion of the supporting member 13 in order to apply the voltage pulse while in contact with the wire electrode 2. This shoe 4 is in contact with the wire electrode 2 which is moved between the upper and lower guide rollers.

Also, the hollow cylindrical nozzle main body 5 is fixed to the lower end portion of the supporting member 13, or it is attached thereto so that it can be adjusted.

Opening portions 51 and 52 are substantially coaxially formed in the upper and lower end surfaces of nozzle main body 5 and the wire electrode 2 passes therethrough along the central axis of these opening portions.

Further, guide holder 6 having an upper positioning die 61 is coaxially fixed inside the nozzle main body 5, or it is attached thereto so that it can be adjusted as necessary.

The guide holder 6 is a hollow pipe whose lower portion is of smaller diameter than the upper portion and holder 6 has working fluid flow orifices 6a in the side wall thereof.

In addition, the positioning die 61 is attached to the lower end portion of the guide holder 6. The passage through which the wire electrode 2 passes for use in working of the workpiece 3 is determined by die 61.

On the other hand, the nozzle 7 slidably engages the opening 52 at the bottom of the nozzle main body 5 and is located in a proper position in accordance with the supply pressure and flow rate of the working fluid, the distance to the workpiece 3, and the like.

The nozzle 7 is a hollow pipe having a flange 71 at one end, and a tubular portion of the nozzle 7 is coaxially inserted into the opening 52 in the bottom surface of the nozzle main body 5 so that it can freely slide in the axial direction.

The outer diameter of the flange 71 which is located in the nozzle main body 5 is larger than the inner diameter of the opening portion 52 to secure the nozzle 7 in the nozzle main body 5.

A nozzle adapted to be coupled with a pressure supply hose 53 for the working fluid is provided in the upper portion of the nozzle main body 5, and the working fluid is supplied into the nozzle main body 5 through this nozzle.

The working fluid serves to cool the positioning die 61 inside the nozzle main body 5 and the fluid is discharged from the nozzle 7 at the lower portion to the workpiece 3 along the wire electrode 2, and at the same time the fluid is discharged upwardly from the upper opening 51, thereby to cool the wire electrode 2 and current supplying shoe 4.

Additionally, the workpiece 3 is attached to a working table 31.

The working table 31 is movable along a predetermined path which is perpendicular to the central axis of the wire electrode 2 by means of motors 32 and 33 under control of a numerical control unit.

In this wire-cut discharge machine, electric discharge is generated in the work gap between the wire electrode 2 and the workpiece 3, while the energy necessary for machining the workpiece 3 is mainly supplied from the current supplying shoe 4 to the wire electrode 2. The wire electrode 2 receives the current while moving in contact relation with the surface of the current supplying shoe 4. Also, since the wire electrode 2 is thin wire material having a diameter of about 0.05 to 0.30 mm, the contact area therebetween is small and the contact resistance is too large to be ignored.

Due to this, unless the current supplying shoe 4 is forcedly cooled, the temperature thereof will become fairly high in a relatively short time after the start of work, so that the wire electrode 2 may be easily broken, depending upon the average working current.

Therefore, as mentioned above, the working fluid is discharged from the opening 51 of the nozzle main body 5 along the wire electrode 2 and is splashed on the current supplying shoe 4 whereby the shoe is cooled, thereby preventing the breaking of wire electrode 2.

However, the present inventors have found that it is impossible to completely prevent the breaking of wire electrode 2 at the current supplying portion by means of such conventional well-known cooling.

This problem will be explained with reference to FIGS. 2 and 3.

Figure 2:
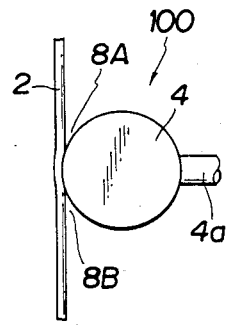
Figure 3:
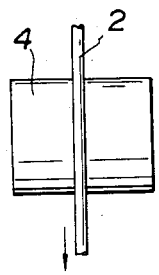
FIG. 3 is an enlarged side elevational view showing the current supplying apparatus.

In the conventional current supplying apparatus 100 which has been most widely employed, the cylindrical current supplying shoe 4 as shown in FIGS. 2 and 3 is horizontally supported by a supporting arm 4a and it comes into contact with the wire electrode 2 moving along the vertical path, thereby supplying the current for machining.

The details of the internal structure of this supporting arm 4a and the method of attaching the current supplying shoe 4 are disclosed, for example, in the Official Gazette of Japanese Utility Model Disclosure No. 014014/1981.

The current supplying apparatus of this type is widely used since there are advantages that the frictional resistance for the wire electrode 2 is small and it is easily machinable.

However, as shown in FIG. 2, wedge-shaped gaps 8A and 8B are formed between the wire electrode 2 and the cylindrical surface of the current supplying shoe 4.

The wire electrode 2 is bent along a small arc of constant length, due to the contact pressure with the current supplying shoe 4.

However, in other portions than the above-mentioned contact portion, the wire electrode 2 becomes a straight line which is parallel to a tangent of the above-mentioned cylindrical surface at both end points of the contact portion, so that the contact angle between them at each of the contact end points becomes 0°.

In other words, the gap between the wire electrode and shoe in this portion becomes the extremely small and sharply pointed wedge-like gap space.

On the other hand, the cooling water in this gap is heated due to the thermal conduction from the current supplying shoe 4 which is at a high temperature and the Joule's heat generated by the current flowing inside the shoe, so that the water is vaporized; in addition, the cooling water is electrolyzed due to the current, so that gas is generated.

Thus, it has been discovered that even if vapor and gas are subjected to the strong jet stream of the cooling water, they will remain for along time in those gaps, particularly, in the lower gap 8B of the current supplying shoe 4; due to this, air bubbles consisting of the gas vapor almost always exist in this gap 8B; and these air bubbles lead to accidental breaking of the wire electrode.

Namely, because this gas or water vapor surrounds the contact portion of the wire electrode 2 and current supplying shoe 4, it obstructs the supply of fresh cooling water to the contact portions.

Since the gas and vapor have low thermal conductivity, a small quantity of cooling water which still remains in the contact portion is rapidly evaporated or vaporized or gasified due to the electrolysis and this provides an opportunity of occurrence of gaseous discharge between them.

Although the gaseous discharge is not always generated immediately even in this state, however, if the wire electrode 2 is skipped or a poor contact occurs for some reason, in the inside of the air bubbles remaining, there will be caused a current, i.e., spark discharge accompanied with the dielectric breakdown of the gaseous layer interposed between the current supplying shoe 4 and the wire electrode 2.

Since this spark discharge causes a damage to the wire electrode 2 to a certain degree, the wire electrode will be immediately broken or even if it is not broken at that time, it will be easily broken in the case where the discharge occurs in that damaged portion or a short-circuit and the like occur in that portion when the wire electrode 2 is sent to the machining portion for the workpiece 3.

As is often the case when the wire electrode 2 is subjected to ultrasonic vibration and the like, or, even when it is not, the wire electrode is always vibrating since it is subjected to influences such as the impact pressure in association with the discharge generated in the work gap, the vortex stream in the discharged working fluid jet stream, the variation in friction at each portion of the take-up apparatus, and the like.

This vibration reduces the friction and contact resistance between the wire electrode 2 and the current supplying shoe 4 and at the same time assists in the removal of the above-mentioned air bubbles.

However, on the other hand, if the contact portion is surrounded by these gases and the gas enters between the contact surfaces, it can be the cause of spark discharge. Therefore, in this invention, such current supplying apparatuses as shown in FIGS. 4 to 14 will be employed so as not to cause the spark discharge between the wire electrode and the current supplying shoe.

All of them are constituted in the manner such that the contact angle between the wire electrode and the current supplying shoe at each of both upper and lower end points of the contact portion therebetween, particularly, at the troublesome lower end point, is not 0°, preferably, it is set to an angle from 60° to 90° or more, and any gas is not able to remain in the contact portion between them.

This object is accomplished by an arrangement in which the contour shape of the current supplying shoe is formed like a square at the end point of the contact portion with the wire electrode and that in the case of observing from the end point of the problem, these elements strongly contact each other on the side of the contact portion and they rapidly depart on the non-contacting side, or, by filling the above-mentioned wedge-shaped gap space between the current supplying shoe and the wire electrode with proper substance.

The current supplying apparatuses will be sequentially described hereinbelow beginning with FIG. 4.

Figure 4:
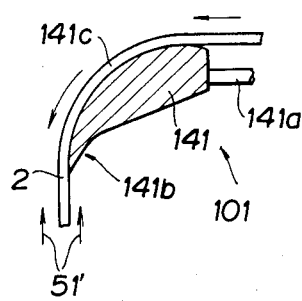
FIG. 4 is a side elevational view with a part cut away showing a current supplying apparatus according to one embodiment of the present invention.
Figure 5:
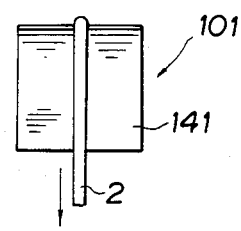
FIG. 5 is a front view of the current supplying apparatus shown in FIG. 4.

A current supplying apparatus 101 shown in FIGS. 4 and 5 comprises: a current supplying shoe 141 having a beak-like or plough-like cross section; and a bar 141a for supporting the shoe and supplying current. Also, numeral 51' indicates a jet stream of the cooling water discharged to the current supplying apparatus 101 along the wire electrode 2. The current supplying shoe 141 has a sharp pointed edge portion 141b at the lower end portion, and the surface shape of the portion from the upper surface thereof to the edge portion 141b is substantially a one quarter cylindrical 141c.

The wire electrode 2 horizontally approaches from the right side of drawing and changes the direction through an angle of about 90° on this quarter cylindrical surface 141c and departs vertically downward.

Consequently, the passage of the wire electrode 2 is constituted in the manner such that when the wire electrode passes along the current supplying shoe 141, it is in close contact with the quarter cylindrical surface 141c and after it departs from the point of its edge portion 141b, the wire electrode is moved along the tangent line of the quarter cylindrical surface 141c.

In this embodiment, the sharp edge portion 141b is provided on the current supplying shoe 141, thereby allowing the wire electrode 2 to depart from the point of the edge portion 141b. The complementary angle of the contact angle at that point, namely, of the angle between the surface or the tangent line on the side where the wire electrode 2 is in contact with the edge portion and the surface or the tangent line on the non-contacting side extending therefrom is set to be as large as possible, i.e., an angle of at least 60°.

In this state, a narrow gap in which the gas could remain is not formed between the wire electrode 2 and the edge portion 141b. On the other hand, the current supply from the current supplying shoe 141 to the wire electrode 2 is mainly performed at the portion where the pressure based on the tension which acts on the wire electrode 2 becomes maximum, namely, at the portion of the shoulder in the left upper portion in the drawing.

Therefore, no air bubbles are produced and even if air bubbles adhered on the wire electrode 2 intend to remain on the point side of the edge portion 141b of the current supplying shoe 141, they are forcedly sent up along the surface of the point and are removed therefrom due to the jet stream 51' and the sharp pointed form of the edge portion 141b. Thus, the cooling of the wire electrode 2 and current supplying shoe 141 by the jet stream 51' is not obstructed by the air bubbles, thereby completely avoiding spark discharge and accidental breaking of the wire.

Figure 6:
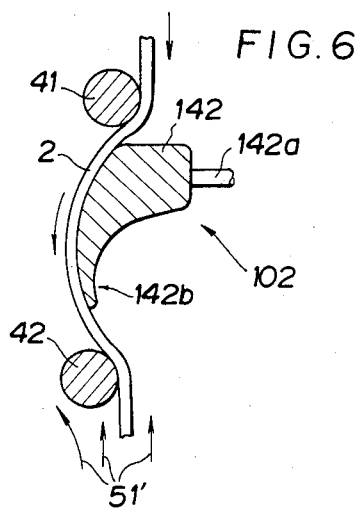
FIG. 6 is a side elevational view with a part cut away showing another embodiment of the invention.

The current supplying apparatus 102 shown in FIG. 6 comprises: a current supplying shoe 142 having a cross section like a low shoe; a bar 142a for supporting the current supplying shoe 142 and supplying current; and guide rollers 41 and 42 for the wire electrode.

A feature of this embodiment is that the wire electrode 2 is pressed against the current supplying shoe 142 by use of the guide rollers 41 and 42.

In this current supplying apparatus 102, a toe portion 142b of the current supplying shoe 142 is kept closely in contact with the wire electrode 2 and there is no room for air bubbles to remain therein, so that it is possible to prevent consequent spark discharge and accidental breaking of wire. In a current supplying apparatus 103 shown in FIG. 7, a current supplying shoe 143 is used which has a pentagonal cross section of which one vertical angle is rounded. In addition, a numeral 9 indicates a terminal to which a power line is connected.

Figure 7:
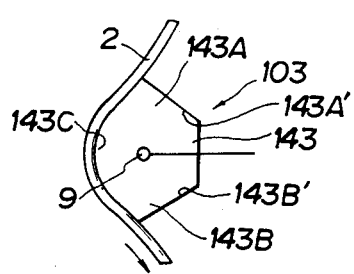
FIGS. 7 to 10 are side elevational views with a part cut away showing other different embodiments of the invention respectively.

In the embodiment shown in FIG. 7 and subsequent figures as well, the guide rollers and jet stream of the cooling fluid as shown in FIG. 6 are suitably used, but they are all omitted in the drawing.

The wire electrode 2 is brought into contact with the side surface on the left side of the current supplying shoe 143 and is moved along the geodesic line of that surface from the upper portion to the lower portion.

Even in this embodiment, the current supplying shoe 143 is constituted such that the complementary angle of the angle between the surface which is in contact with the wire electrode 2 and the non-contact surface adjacent thereto, namely, the complementary angle of the angle between the surface which is in contact with the wire electrode 2 and a surface 143A' of an upper portion 143A of the current supplying shoe 143, and the complementary angle of the angle between the surface which is in contact with the wire electrode 2 and a surface 143B' of a lower portion 143B are all at least 60° or more, preferably, an obtuse angle.

In the case where the wire electrode 2 is fed from the top to the bottom, it is desirable to form a very small round corner at the upper end of the ridge line of the upper surface 143A', namely, in the portion where the wire electrode 2 is received and the contact therewith starts. However, there is no need to form such a round corner at the lower end of the ridge line of the lower surface 143B'.

In this embodiment, the current supply from the current supplying shoe 143 to the wire electrode 2 is mainly performed from an arc portion 143C on the left side of the current supplying shoe 143.

Therefore, in this embodiment also, similarly to the foregoing embodiment, no air bubbles are produced or even if air bubbles are produced, they are naturally and immediately removed due to the jet stream of the cooling fluid as shown in the drawings, so that the air bubbles substantially do not enter the arc portion 143C serving as the main current supplying portion, and consequently, the spark discharge can be completely prevented.

Figure 8:
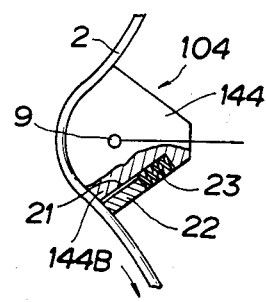

A current supplying apparatus 104 shown in FIG. 8 comprises: a current supplying shoe 144 similar to the current supplying shoe 143; an insulating member 22 inserted in a notched concave portion 21 provided in a lower portion of the shoe 144 so that it is slidable in the direction normal to the wire electrode; and a spring 23 is provided to press the free end of the insulating member 22 against the wire electrode 2.

In this embodiment, after the wire electrode 2 has departed from a lower end portion 144B of the current supplying shoe 144, it immediately comes into contact with insulating member 22, so that even if the air bubbles exist in this portion, spark discharge will not be caused and the current supplying portion will be further certainly shut off from the air bubbles.

Figure 9:
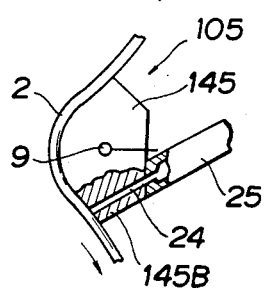

In a current supplying apparatus 105 shown in FIG. 9, a duct 24 for fluid purge is provided in the lower portion of a similar current supplying shoe 145 as the shoe 144 and a working fluid supply pipe 25 is coupled to the duct 24.

Therefore, the gases produced between the wire electrode 2 and the current supplying shoe 145 at the lower portion thereof are purged and dispersed by the working fluid supplied continuously from the duct 24 before harmful air bubbles are formed.

On the other hand, in this embodiment, it is also possible for the pipe 25 to be coupled to an appropriate suction apparatus, thereby absorbing and draining the existing gases together with a part of the cooling fluid from the portion near the opening of the duct 24.

Figure 10:
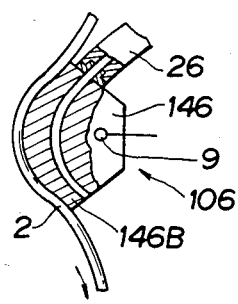

In a current supplying apparatus 106 shown in FIG. 10, a duct for cooling water is provided so as to pass through current supplying shoe 146 which is similar to shoe 145, and a working fluid supply pipe 26 is coupled to one opening of the duct.

This apparatus intends to further allow the working fluid to pass inside the current supplying shoe 146 and to cool it in addition to that of the current supplying apparatus 103 shown in FIG. 7, thereby suppressing the generation of water vapor in the current supplying portion to the wire electrode 2 to a minimum. As such a cooling duct, the duct 24 described in conjunction with FIG. 9 may be used.

Next, a current supplying apparatus shown in FIGS. 11 and 12 will be described.

In a current supplying apparatus 107, the laterally placed cylindrical current supplying shoe 4 shown in FIGS. 1 to 3 is used, and the gap 8B between the current supplying shoe 4 and the wire electrode 2 is filled with suitable stuffing material, thereby preventing the gas from remaining therein.

In the drawings, a numeral 15 denotes filler material; 16 is movable supporting arm; 17 a casing for a universal joint 17A; 18 a spring; and 19 a fixed supporting arm.

The filler material 15 has the shape and dimensions to fit the gap space which is formed by the current supplying shoe 4 and wire electrode 2.

The movable supporting arm 16 which supports the filler material 15 at one end is rotatably and axially slidably connected to fixed supporting arm 19 in the casing 17. The filler material 15 is pressed into the gap 8B between the current supplying shoe 4 and the wire electrode 2 due to the elastic force of spring 18 and occupies the space 8B, thereby inhibiting the intrusion of air bubbles.

Although the filler material 15 can be manufactured of good electric conductor or insulator material, when it is manufactured from good conductor material, it is desirable to cover the lower end surface of the filler material with an insulating coating.

By doing this, the current can be fed through the filler material 15 as well, and it is also possible to prevent the occurrence of abnormal discharge such as spark discharge and the like at the lower end surface of the filler material 15.

This embodiment can be applied not only to a fixed type current supplying apparatus using a current supplying shoe and the like, but also to a rotary type current supplying apparatus using a rotary roller and the like.

Figure 13:
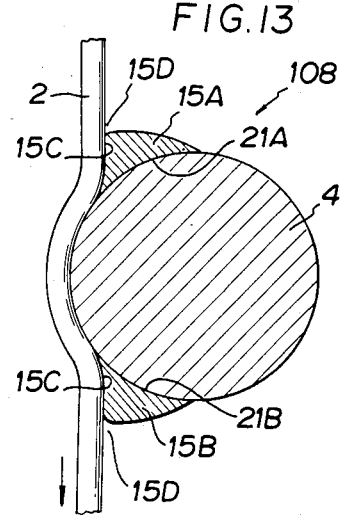
FIG. 13 is a side elevational view with a part cut away showing still another embodiment of the invention.
Figure 14:
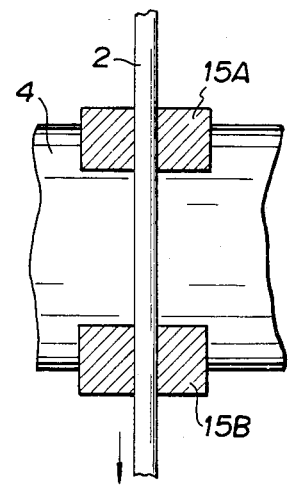
FIG. 14 is a front view of the current feeing apparatus shown in FIG. 13.

A current supplying apparatus 108 shown in FIGS. 13 and 14 will next be described. Although the air bubble purge apparatus has been provided on only the lower side of the current supplying shoe in the foregoing respective embodiments, in this embodiment, filler materials 15A and 15B each having electrical insulative property are adhered to the upper and lower portions of the current supplying shoe 4 through adhesive agents 21A and 21B, thereby preventing the intrusion of air bubbles.

It is desirable to manufacture the filler materials 15A and 15B from low-friction resin, synthetic resin including friction reducing agent, or inorganic insulation material.

Any one of these materials is preferably fitted at the passage of the wire electrode and minimizes the volume where the air bubbles could remain.

In these embodiments, the cross sectional shape of the current supplying shoe 4 is not limited to a circle, and the shapes of the filler materials 15, 15A and 15B are obviously not limited to those shown in the drawings.

Ordinary wire-cut electric discharge machines are constituted such that the wire electrode can be generally vertically moved from the upper portion to the lower portion and each set of current supplying apparatus is provided at the upper and lower portions of the workpiece.

In general, the fixed type current supplying shoe is suitable to supply the current to the virgin wire electrode; however, it is not suitable for supply of current to a wire electrode which has been used and has a number of discharge traces on the surface.

In order to supply electric current to such a used wire electrode, a rotary type current supplying apparatuses comprising a capstan, pinch roller or other rotary rollers, current supplying pulley, etc. are generally employed.

Figure 11:
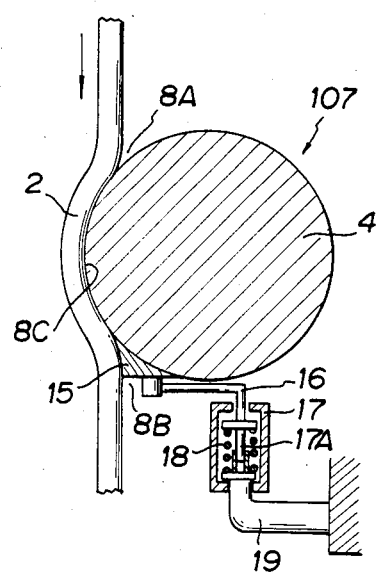
FIG. 11 is a side elevational view with a part cut away showing a further embodiment of the invention.
Figure 12:
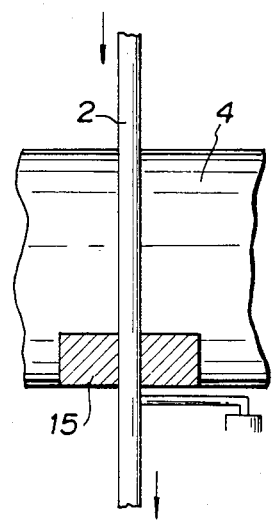
FIG. 12 is a front view of the current supplying apparatus shown in FIG. 11.

The above-described apparatus shown in FIGS. 11 and 12 can be applied to those current supplying apparatuses.

Since the current supplying apparatus by use of the fixed shoe as mentioned before is generally provided in the upper portion above the workpiece, the apparatus of the present invention is also ordinarily applied to the upper current supplying apparatus above the workpiece.

However, in the case where the wire electrode is moved from the lower portion to the upper portion, it can be obviously applied to the current supplying apparatus which is provided in the lower portion below the workpiece.

Namely, although the present invention is implemented in the apparatus of the current supplying shoe type which is mainly provided on the supply side of the wire electrode, it can be also applied to other types of current supplying apparatus and a current supplying apparatus on the wire electrode collecting side.

On the other hand, in the wire-cut discharge machine of the laterally placed type, the passage of the wire electrode is horizontally mounted and fed, and even in this case, if a current supplying member similar to the above-mentioned member is used, the present invention can be applied by suitably modifying one of the above-mentioned corresponding embodiments.

In addition, the arrangement of the present invention is not limited to the above-described embodiments, but, the invention incorporates all of the current supplying apparatuses which are constituted in the manner such that in order to effectively cool both the wire electrode and current supplying apparatus, the shape of the current supplying member such as the current supplying shoe, roller, pin, or the like which is in direct contact with the wire electrode is properly selected, or the gap between the current supplying member and wire electrode is packed with material, thereby avoiding the narrow wedge-like gap where air bubbles could remain between the wire electrode and the apparatus.

INDUSTRIAL APPLICABILITY

By adopting the current supplying apparatus according to the present invention in a prior art wire-cut electric discharge machine, the accidental breaking of the wire electrode at the current suppying portion is almost completely prevented and the reliability of the discharge machine is increased, thereby enabling the automatic operatorless operation to be performed for a long time. At the same time, since the maximum capacity of the current is safely and substantially increased, this makes high speed work possible, so that both the efficiency of investment and productivity of labor are remarkably improved.

We claim:

1. An apparatus for supplying current to a wire electrode of a wire-cut electric discharge machine comprising means for supplying working fluid to an electrode including a hollow main body and a nozzle on said body for discharge of the working fluid against the electrode, a current supplying member for supplying electric current to the wire electrode, said current supplying member being positioned outside said hollow main body for contacting the wire electrode at a location spaced from said main body, and means for discharging a cooling fluid from said main body against said current supplying member, said current supplying member having a contact surface on which the wire electrode travels in contact therewith, said contact surface having opposite ends, at a first of which the electrode first contacts the current supplying member and at the second of which the electrode leaves the current supplying member, said cooling fluid being discharged against one of said ends, said current supplying member having a back surface which forms an angle with the electrode extending from said contact surface, at said end against which the fluid is discharged, which is greater than 90 degrees, said current supplying member being tapered between said back surface and said contact surface to widen at an acute angle from said end at which the cooling fluid is discharged to prevent formation of gaps between the current supplying member and the electrode end provide a substantially continuous flow path for the discharged fluid along said back surface.

2. A current supplying apparatus according to claim 1 wherein said current supplying member is a fixed current supplying shoe which is electrically insulative at said contact surface.

3. A current supplying apparatus according to claim 1 wherein said current supplying member is a fixed current supplying shoe having a duct for conveying cooling fluid against said end at which the cooling fluid is discharged.

4. A current supplying apparatus according to claim 1 wherein said current supplying member is a fixed current supplying shoe having a cooling fluid duct within said shoe.

5. A current supplying apparatus according to claim 1 wherein said current supplying member comprises a shoe having a relatively thin sole at the end against which the cooling fluid is discharged and a relatively thick heel portion at the other end.

6. A current supplying apparatus according to claim 5 wherein said sole is of wedge shape with an included acute angle.

7. A current supplying apparatus according to claim 1 comprising guide rollers respectively positioned upstream and downstream of said ends of said contact surface to press the wire electrode against the contact surface.

8. An apparatus as claimed in claim 1 wherein said current supplying member is positioned relative to said main body so that at said one end of the contact surface of the current supplying member at which the cooling fluid is discharged the electrode extends between the current supplying member and said hollow main body.

9. An apparatus as claimed in claim 1 wherein said back surface and said contact surface form a complementary angle of at least 60°.

10. An apparatus as claimed in claim 1 wherein said contact surface and said back surface taper to a vertex portion at said one end.

11. An apparatus as claimed in claim 1 wherein said back surface is smoothly curved and forms a narrow toe portion at said one end and a wider heel portion at the other end.

12. An apparatus as claimed in claim 1 wherein said back surface forms a second tapered part to define a narrow toe portion at said one end and a wider heel portion at the other end.

* * * * *